Figure 1:
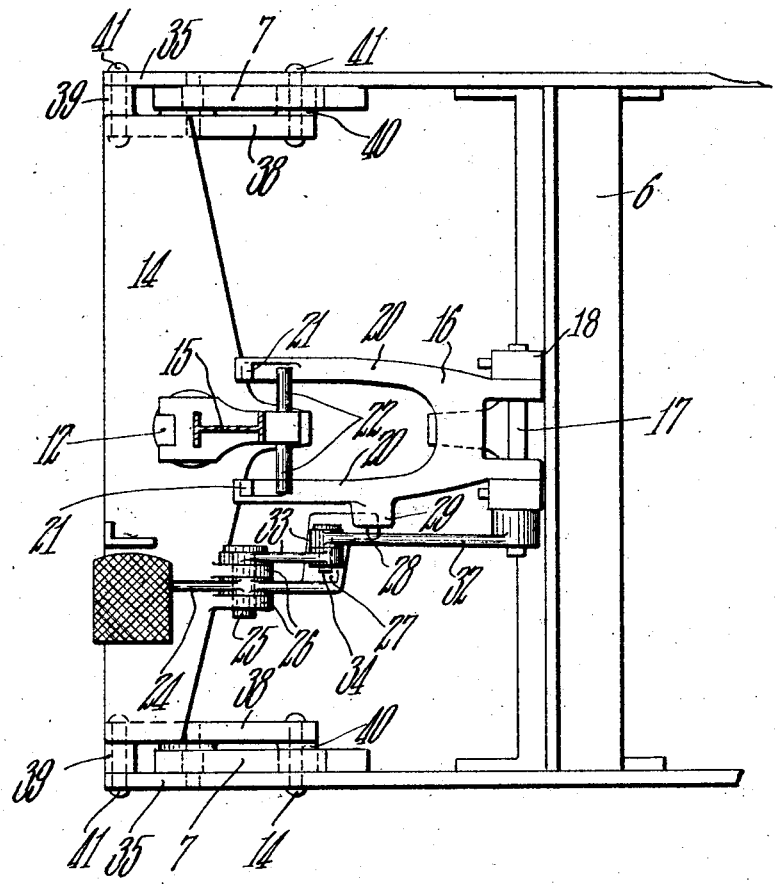

Nov. 10, 1925.

J. M. EATON 1,560,676

ELEVATING TRUCK

Filed Aug. 10, 1922      2 Sheets-Sheet 1

INVENTOR
James M. Eaton.
BY
ATTORNEYS

Nov. 10, 1925.  
J. M. EATON  
1,560,676  
ELEVATING TRUCK  
Filed Aug. 10, 1922   2 Sheets-Sheet 2
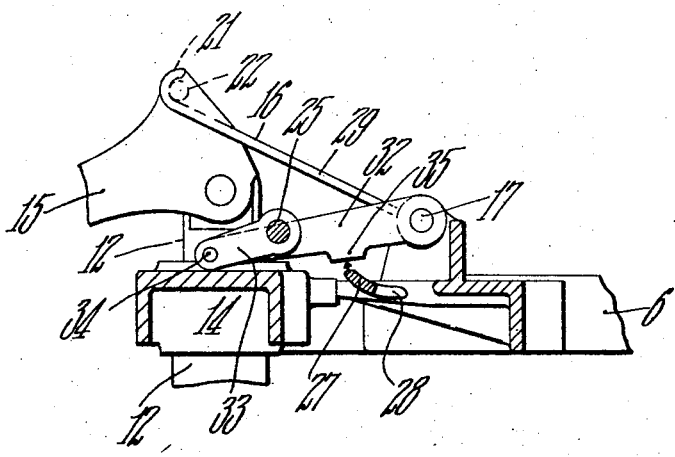
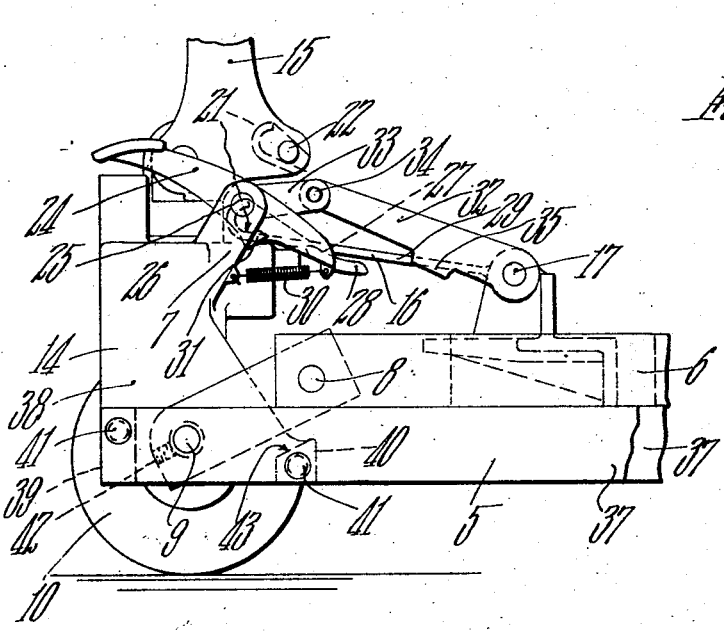
INVENTOR  
James M. Eaton  
BY  
ATTORNEYS Patented Nov. 10, 1925.

1,560,676

UNITED STATES PATENT OFFICE.

JAMES M. EATON, OF HOLYOKE, MASSACHUSETTS, ASSIGNOR TO EDWARD N. WHITE, J. LEWIS WYCKOFF, AND JAMES M. EATON, ALL OF HOLYOKE, MASSACHUSETTS, TRUSTEES, DOING BUSINESS AS COWAN TRUCK COMPANY.

ELEVATING TRUCK.

Application filed August 10, 1922. Serial No. 580,910.

*To all whom it may concern:*

Be it known that I, JAMES M. EATON, a citizen of the United States, residing at Holyoke, in the county of Hampden and State of Massachusetts, have invented new and useful Improvements in Elevating Trucks, of which the following is a specification.

This invention relates to elevating trucks such as are used for transporting goods in factories, warehouses and the like. Although not limited thereto, the invention relates more particularly to elevating trucks of the general character disclosed in United States Patent No. 1,373,069, granted March 29, 1921, to D. E. Hennessy, and the illustrated embodiment of the invention is designed primarily as an improvement of the truck construction illustrated, described and claimed in said patent.

A general object of the present invention is to provide improved means for holding the platform of an elevating truck in raised position.

With the above and more specific objects in view, as will later appear, the invention consists in the features of construction and the combinations and arrangements of parts hereinafter described and claimed, the advantages of which will be apparent to those skilled in the art.

The invention will be explained with reference to the accompanying drawings, in which, Fig. 1 is a top plan view of the front end of an elevating truck showing the present invention, in its preferred form, embodied therein;

Fig. 2 is a view, in side elevation, of the portion of the truck shown in Fig. 1, the platform being shown in its lowered position; and Fig. 3 is a detail view of certain of the parts shown in Fig. 2, the view being partially in side elevation and partially in section and showing the truck platform locked in raised position.

Referring to the drawings, there has been shown so much of an elevating truck as is necessary to illustrate the application of the present invention thereto. With the exception of the means for holding the truck platform in raised position and certain other details of construction hereinafter referred to, the illustrated truck is substantially the same in construction as the truck disclosed in the above mentioned Patent No. 1,373,069. Accordingly it will not be necessary in this application to explain in detail the construction of those portions of the illustrated structure which correspond to similar parts shown in said patent.

Briefly described, however, the truck in which the present invention is embodied, comprises a lower base frame 5 and an upper platform 6, which is connected with the base frame and adapted for up and down movement relatively thereto, by means of swinging links which are arranged in pairs at the front and rear of the truck. The forward pair of links are indicated at 7 and are pivotally connected at 8 to the platform and at 9 to the base frame, while the rear links (not shown) are connected to the platform and base frame in a like manner. The base frame is supported upon a front steering wheel 10 and the usual rear wheels (not shown). The front wheel 10 is carried by a wheel fork 12 which is swivelled in a head 14 constituting the forward end portion of the base frame. Pivoted to the upper portion of the swivelled wheel fork is a steering handle 15 which is also utilized as the operating lever for elevating the platform. When disengaged from the platform, as hereinafter described, the steering handle 15 is free for vertical and horizontal swinging movements in hauling and guiding the truck. The handle 15 is adapted to be connected with the platform for the purpose of elevating the latter, by means of a hook line 16 which is pivotally mounted upon a horizontal stud 17 that is fixedly secured in lugs 18 at the front end of the platform 6. The hook link 16 is provided with two spaced side arms 20 (Fig. 1) which are hooked at their free extremities, as shown at 21, for engagement with a cross-pin 22 carried by a projection of the handle 15. Normally the hook link 16 is maintained by gravity in an idle position wherein its free forward extremity is disengaged from the cross-pin 22 and rests upon the head 14. The idle position assumed by the hook link 16 when it is disengaged from the cross-pin 22 and when the platform is in its lowered position, is shown in Fig. 2.

When it is desired to elevate the platform, the hook link 16 is raised from the idle position shown in Fig. 2 by means of a foot lever or treadle member 24, which is pivotally mounted intermediate its ends upon a horizontal stud 25, the stud 25 extending through and being fixedly secured in ears 26 which rise from the head 14 and embrace the foot lever. The foot lever 24 is provided at its rear end with a lateral offset 27 and said offset has a rearward extension 28 which is adapted to engage an outwardly projecting lug 29 on the adjacent side arm of the hook link 16. Normally the foot lever or treadle 24 is maintained, by means of a suitably arranged spring 30 in the idle position in which it appears in Fig. 2, this position being determined by the engagement of a stop lug 31 (Fig. 2) carried by the treadle with one of the ears 26. When the treadle 24 is depressed, the extension 28 will function to raise the hook link 16 into the dotted line position shown in Fig. 2, wherein the hook 21 is so located as to be engaged by the cross-pin 22 immediately upon forward tilting of the steering handle. Continued forward swinging of the steering handle then pulls upwardly on the hook link and finally raises the platform into the elevated position shown in Fig. 3.

The operating parts so far described are or may be of substantially the same construction and their mode of operation is substantially the same as that of corresponding parts disclosed in the patent hereinbefore referred to. The present invention, however, contemplates the provision of novel and improved means for holding the platform in its raised position. The improved holding means functions automatically and immediately upon the arrival of the platform at its elevated position and serves as a lock to positively retain the platform against subsequent downward displacement. The platform holding or locking means is further so constructed and arranged that it may be readily released by depression of the treadle so as to unlock the platform to permit the latter to descend to its lowered position.

In accordance with the present invention, the improved means for locking the platform in its raised position comprises a toggle device which is adapted to fold into toggle-locking position when the platform is raised. To this end, as shown in the drawings, the toggle device comprises a pair of links 32 and 33 which are pivotally connected together by means of a pin 34 that constitutes the knuckle of the toggle. The link 32 is pivotally mounted upon the stud 17 that is carried by the platform. The link 33 is pivotally mounted upon the stud 25 that is carried by the head 14 of the base frame.

When the platform is in its lowered position, as shown in Fig. 2, the toggle links are arranged with the knuckle pivot 34 located somewhat above the common axial plane of the pivot studs 17 and 25. Consequently as the platform 6 is raised the knuckle pivot 34 moves in a counter-clockwise direction (viewing Fig. 3) around the pivot stud 25, and this movement continues until the platform has been completely elevated and the links have been folded into the position in which they appear in Fig. 3. When positioned as shown in Fig. 3, the knuckle pivot 34 has reached a position just below the common axial plane of the pivot studs 17 and 25. Further movement of the knuckle pivot 34 in a counter-clockwise direction is prevented by engagement of the connected ends of the toggle links with the flat upper face of the head 14 and the toggle links are then operative to positively lock the platform against descent.

To enable the toggle mechanism to be readily released from toggle-locking position when desired, the link 32 is disposed above the offset 27 on the foot lever 24 and is so arranged that when the toggle links are in locking position, a projection 35 on the lower edge of the link 32 is located closely adjacent said offset so as to be engaged and lifted by the latter upon a slight upward movement thereof due to a depression of the foot treadle. As the link 32 is lifted by means of the treadle, the knuckle pivot 34 will be raised above the line of the axes of the studs 17 and 25, whereupon the locking action of the toggle will cease and the platform will descend under the action of gravity.

It will be seen that the above described toggle-locking mechanism affords an extremely simple and effective means which becomes operative immediately upon elevation of the platform to its raised position and which positively locks the platform so that it cannot accidentally descend no matter how great a load may be supported thereby. The relative arrangement of the toggle mechanism and the treadle 24 whereby the former is enabled to be released from locking position by actuation of the treadle to be utilized, when the platform is lowered, for the purpose of lifting the hook link 16 into position for engagement by the cross-pin 22 and, when the platform is elevated, for releasing the toggle mechanism from locking position. Thus the treadle 24 performs two functions and the employment of separate treadles or other members for raising the hook link and releasing the toggle mechanism is rendered unnecessary. In this way the number of operating parts of the truck is reduced to a minimum.

A further feature of novelty resides in the specific structure of the base frame 5 which, in the illustrated embodiment of the invention, comprises two side beams 37 that are connected at their forward ends by the head 14 and at their rear extremities by means of a suitable cross-bar (not shown). To reinforce the base frame against side strains tending to weaken the joints between the side beams 37 and the head 14, without interfering with the swinging movements of the platform elevating links 7, the head 14 is preferably constructed and secured to the side beams in the following manner. At opposite ends, the head 14 is provided with depending face plates 38 which are arranged to be in parallel spaced apart relation to the side beams when the latter are secured in place. To this end the face plates 35 are disposed in vertical planes at right angles to the front side of the head and their outer faces are provided with front and rear spacing lugs 39 and 40. The side beams 37 are secured to the face plates 38 by means such as bolts or rivets 41 which extend through the side beams 37, the spacing lugs 39 and 40, and the face plates 38. The side beams are thus secured, at spaced apart points adjacent each end, to the head 14 thus affording a strong and rigid construction of the corners of the base frame. As shown, the lower ends of the platform-lifting links 7 are interposed between the face plates 38 and the respective side beams 37 and the pivot studs 9 for said links are fixedly secured to the latter by means of set-screws 42. The studs 9 project beyond both sides of the links 7, each stud being journaled at one end in the respective face plate 38 and at the opposite end in the respective side beam 37. The spacing lugs 40 are cut away, as shown at 43, to avoid interference with the links 7 when the platform is in lowered position.

The invention has been disclosed herein for illustrative purposes in an embodiment at present preferred but the scope of the invention is to be determined by the appended claims rather than by the foregoing description.

What I claim is:—

1. In an elevating truck, in combination, an elevating platform, steering and supporting wheels therefor, a steering handle pivoted for vertical swinging movement, means for elevating said platform by vertical swinging movement of said handle comprising a detachable connection between the handle and the platform, and separate means for locking the platform in raised position comprising toggle mechanism arranged to fold into toggle locking position when said platform is raised, and means for releasing said locking means comprising a pivoted treadle which is free of engagement with said toggle mechanism to actuate said detachable connection except when said platform is in raised locked position.

2. In an elevating truck, in combination, an elevating platform, steering and supporting wheels therefor, a steering handle pivoted for vertical swinging movement, means for connecting said platform and handle to elevate the platform by vertical swinging movement of the handle comprising a lifting hook link carried by one of said parts and normally tending to assume an inoperative position wherein it will not interfere with movement of the handle, separate means for locking the platform in raised position comprising toggle mechanism arranged to fold into toggle-locking position when the platform is raised, and a treadle member operable when the platform is lowered to move said lifting hook link into position to be operatively engaged by said handle and when the platform is elevated to throw said toggle mechanism out of toggle-locking position to enable the platform to be lowered.

3. In an elevating truck, in combination, an elevating platform, steering and supporting wheels therefor, carrying portions for said steering and supporting wheels, a steering handle pivoted to said steering-wheel-carrying portion for vertical swinging movement, means for elevating said platform relatively to said steering-wheel-carrying portion by vertical swinging movement of said handle comprising a detachable connection between the handle and said platform, and separate means for locking said platform in raised position comprising a pair of pivotally connected links one link pivotally connected to said platform and the other link pivotally connected to said steering wheel carrying portion arranged to fold into toggle-locking position when said platform is raised.

4. In an elevating truck, in combination, a base frame, steering and supporting wheels therefor, an elevating platform carried by said base frame, a steering handle pivoted for vertical swinging movement, a lifting hook link carried by the platform for connecting said platform and handle to elevate the platform by vertical swinging movement of the handle, said link normally tending to assume an inoperative position wherein it will not interfere with movement of the handle, and toggle-locking mechanism for holding the platform in raised position comprising a pair of toggle links one pivoted to the platform and the other to the base frame, said links being arranged to fold into toggle locking position when the platform is raised, and means under the control of the operator for releasing said toggle-locking mechanism to permit the descent of the platform.

5. In an elevating truck, in combination, a base frame, steering and supporting wheels therefor, an elevating platform carried by said base frame a steering handle pivoted for vertical swinging movement, a lifting hook link carried by the platform for connecting said platform and handle to elevate the platform by vertical swinging movement of the handle, said link normally tending to assume an inoperative position wherein it will not interfere with movement of the handle, and toggle-locking mechanism for holding the platform in raised position comprising a pair of toggle links one pivoted to the platform and the other to the base frame, said links being arranged to fold into toggle-locking position when the platform is raised, a foot lever pivoted upon the base frame and having an offset portion underlying said hook link and one of said toggle links, said lever being operable when the platform is lowered to engage said hook link to elevate it into position to be operatively engaged by said handle and when the platform is elevated to engage said toggle link to throw said toggle-locking mechanism out of locking position, and means for normally maintaining the foot lever in inoperative position.

In testimony whereof I have affixed my signature.

JAMES M. EATON.